United States Patent
Goyal et al.

(10) Patent No.: US 9,749,010 B2
(45) Date of Patent: Aug. 29, 2017

(54) METHOD AND APPARATUS TO DETERMINE ELECTRIC POWER NETWORK ANOMALIES USING A COORDINATED INFORMATION EXCHANGE AMONG SMART METERS

(71) Applicant: Utopus Insights, Inc., Valhalla, NY (US)

(72) Inventors: Aanchal Goyal, White Plains, NY (US); Aleksandr Aravkin, Bronx, NY (US); Younghun Kim, White Plains, NY (US); Tarun Kumar, Mohegan Lake, NY (US)

(73) Assignee: Utopus Insights, Inc., Valhalla, NY (US)

( * ) Notice: Subject to any disclaimer, the term of this patent is extended or adjusted under 35 U.S.C. 154(b) by 0 days.

(21) Appl. No.: 15/273,317

(22) Filed: Sep. 22, 2016

(65) Prior Publication Data
US 2017/0141813 A1    May 18, 2017

Related U.S. Application Data

(63) Continuation of application No. 14/941,192, filed on Nov. 13, 2015, now Pat. No. 9,564,945.

(51) Int. Cl.
*H04B 3/46* (2015.01)
*H04B 3/462* (2015.01)
(Continued)

(52) U.S. Cl.
CPC ............ *H04B 3/462* (2013.01); *H04B 3/542* (2013.01); *H04L 43/0847* (2013.01); *H04B 2001/6912* (2013.01)

(58) Field of Classification Search
CPC ...... H04B 3/462; H04B 3/542; H04L 43/0847
(Continued)

(56) References Cited

U.S. PATENT DOCUMENTS

| 5,070,537 A | 12/1991 | Ohira et al. |
| 5,278,862 A * | 1/1994 | Vander Mey ............ H04B 1/69 375/139 |

(Continued)

FOREIGN PATENT DOCUMENTS

| CN | 102095911 | 6/2011 |
| JP | 2014174910 | 9/2014 |

OTHER PUBLICATIONS

U.S. Appl. No. 14/941,192, filed Nov. 13, 2015.
Office Action dated Mar. 29, 2017 for U.S. Appl. No. 15/439,412.

*Primary Examiner* — Michael Neff

(57) ABSTRACT

A system and method to produce an electric network from estimated line impedance and physical line length among smart meter devices is provided using communication between the smart meters. The smart meters: (1) synchronize time using GPS pps signals, which provide an accurate time stamp; (2) send/receive an identifiable signal through the same phase of electric networks; (3) identify other smart meters on the same phase lines by listening to the information signal on the same phase lines; and (4) calculate time-of-arrival of an identifiable signal from other smart meters. The time of arrival information is used to calculate the line length, which is then used to calculate impedance of a line and topology of the electric network. The system then constructs an electric network by combining geo-spatial information and tree-like usual connection information.

3 Claims, 5 Drawing Sheets

(51) Int. Cl.
*H04B 3/54* (2006.01)
*H04L 12/26* (2006.01)
*H04B 1/69* (2011.01)

(58) Field of Classification Search
USPC .......................................................... 375/226
See application file for complete search history.

(56) References Cited

U.S. PATENT DOCUMENTS

| | | |
|---|---|---|
| 8,774,707 B2 | 7/2014 | Flammer, III et al. |
| 8,825,416 B2 | 9/2014 | Arya et al. |
| 9,564,945 B1 | 2/2017 | Goyal et al. |
| 2004/0082203 A1 | 4/2004 | Logvinov et al. |
| 2010/0259448 A1 | 10/2010 | Qahwash et al. |
| 2012/0059609 A1 | 3/2012 | Oh et al. |
| 2012/0106011 A1 | 5/2012 | Lee et al. |
| 2012/0293373 A1 | 11/2012 | You |
| 2013/0028235 A1 | 1/2013 | Barrett |
| 2014/0062719 A1 | 3/2014 | Rowitch |
| 2015/0098530 A1 | 4/2015 | Tamma et al. |
| 2015/0195670 A1 | 7/2015 | Agee |
| 2016/0012460 A1 | 1/2016 | Kruglick |
| 2016/0080138 A1 | 3/2016 | Biederman |

\* cited by examiner

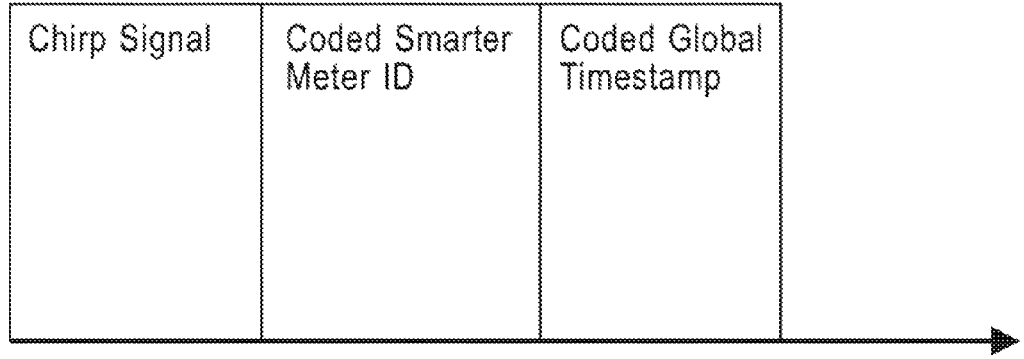

FIG. 5

Construction of Characteristic Matrix $$T = [t_{i,j}] \quad \text{Calculated from packet exchange}$$

where $T$ is a time of travel measurement matrix, $t_{i,j}$ is a time of travel from i=th smart meter to j-th smart meter, and $t_{i,j} = 0$.

$$Z_u = [u_{i,j}] \quad \text{Given}$$

where $Z_u$ is a unit impedance matrix, $u_{i,j}$ is a unit impedance of the line between i-th smart meter to j-th smart meter.

$$C_u = [c_{i,j}] \quad \text{Given}$$

where $C_u$ is a group velocity of communication packet, $c_{i,j}$ is a group velocity of communication packet between i-th smart meter and j-th smart meter $$D = [d_{i,j}] \quad \text{calculated from GPS locations}$$

where $D$ is a Euclidean distance matrix between i-th smart meter and j-th smart meter.

$$Z = [z_{i,j}] = [u_{i,j} t_{i,j} c_{i,j}]$$

where $Z$ is a impedance matrix.

FIG. 6

Anomaly Testing Routines

1. Testing for symmetry $$|t_{i,j} - t_{j,i}| \sim 0$$

2. Temporal path anomaly $$|t_{i,j} c_{i,j} - d_{j,i}| \leq E$$

where $E$ is an acceptable discrepancy.

3. Testing for abnormal impedance $$z_{i,j} \sim 0$$

where $i \neq j$.

4. Testing for inconsistent time-of-arrival $$\bar{t}_{i,j} \sim t_{i,j}(k)$$

where $\bar{t}_{i,j}$ is a mean time-of-arrival and $t_{i,j}(k)$ is a k-th sample of time-of-arrival between i-th and j-th smart meters.

FIG. 7A

Anomaly Testing Routines cont'd

Testing for outlier paths

1. Calculate a normal time-of-arrival / spatial distance $t_{i,j}/d_{i,j}$

2. Characterize the distribution of $t_{i,j}/d_{i,j}$ where $i \neq j$

3. Identify $t_{i,j}/d_{i,j}$ is not similar to a normal population of $\{t_{i,j}/d_{i,j}\}$

FIG. 7B

METHOD AND APPARATUS TO DETERMINE ELECTRIC POWER NETWORK ANOMALIES USING A COORDINATED INFORMATION EXCHANGE AMONG SMART METERS

CROSS-REFERENCE TO RELATED APPLICATION

This application is a Continuation application of co-pending U.S. patent application Ser. No. 14/941,192, filed on Nov. 13, 2015, the entire contents of which are incorporated by reference herein.

BACKGROUND

Technical Field

The present disclosure relates to electric power networks and, more particularly, to smart meters used therein.

Discussion of Related Art

Single-phase power delivery over power lines are used in most homes in North America. The single-phase power is able to supply ample power for most smaller customers, including homes and small non-industrial businesses and is adequate for running motors up to about 5 horsepower.

Accurate identification of an electric network of low voltage power distribution networks is important for reliable operation of electric power grids. In particular, the integration of renewables and plug-in vehicles pushes the demand from customers of the low voltage distribution networks to their capacity limits.

Smart meters are an advanced energy meter that measures consumption of electrical energy providing additional information as compared to a conventional energy meter. Integration of smart meters into an electricity grid involves implementation of a variety of techniques and software, depending on the features that the situation demands. Design of a smart meter depends on the requirements of the utility company as well as the customer.

Power-line communication (PLC) utilizes smart meters to provide for the carrying of data on a conductor that is also used simultaneously for alternating current (AC) electric power transmission or electric power distribution to users.

A need exists for smart meters that not only measure electric power characteristics but that coordinate information exchange among the smart meters for the determination of the electric power network anomalies. Exemplary embodiments of the present disclosure provide solutions to need this need.

BRIEF SUMMARY

Exemplary embodiments of the present disclosure provide a system and method to produce an electric network from measurements by smart meters of a temporal delay, an estimated line impedance and physical line length among smart meter devices.

In accordance with exemplary embodiment of the present disclosure, a method, system and smart meters used therein provide for obtaining and assessing an electric power network of low voltage distribution grids by exchanging information among smart meters of the electric power network by: measuring by the smart meters the time-of-travel through the power lines using an accurate time synchronimzation such as global positioning satellite (OPS) pulse per second (pps) signals to synchronize time to achieve nano second level synchronization accuracy, and measuring signal distortion.

Signal distortion may include total harmonic distortion, frequency distortion, and phase distortion.

Measured time-of-travel may be used to calculate impedance of connecting power lines by multiplying unit impedance.

Measured time-of-travel and derived matrices therefrom may be used to detect anomalies that include time-of-arrival asymmetry, outliers, and temporal characteristic changes. Abnormal operating conditions may be detected by comparing a current measurement matrix with an identified normal operating measurement matrix.

Localization of the abnormal operating conditions may be detected by checking the location in the current measurement matrix by mapping row and column of the current measurement matrix to a connection between two smart meters.

BRIEF DESCRIPTION OF THE DRAWINGS

Exemplary embodiments will be more clearly understood from the following detailed description taken in conjunction with the accompanying drawings in which;

FIG. 5 depicts a chirp packet utilized to send signals along the electric power line in accordance with an exemplary embodiment of the present disclosure;

FIG. 6 sets forth the construction of a characteristic matrix in accordance with an exemplary embodiment of the present disclosure; and FIGS. 7A and 7B set forth anomaly testing routines in accordance with an exemplary embodiment of the present disclosure.

DETAILED DESCRIPTION

Figure 1:
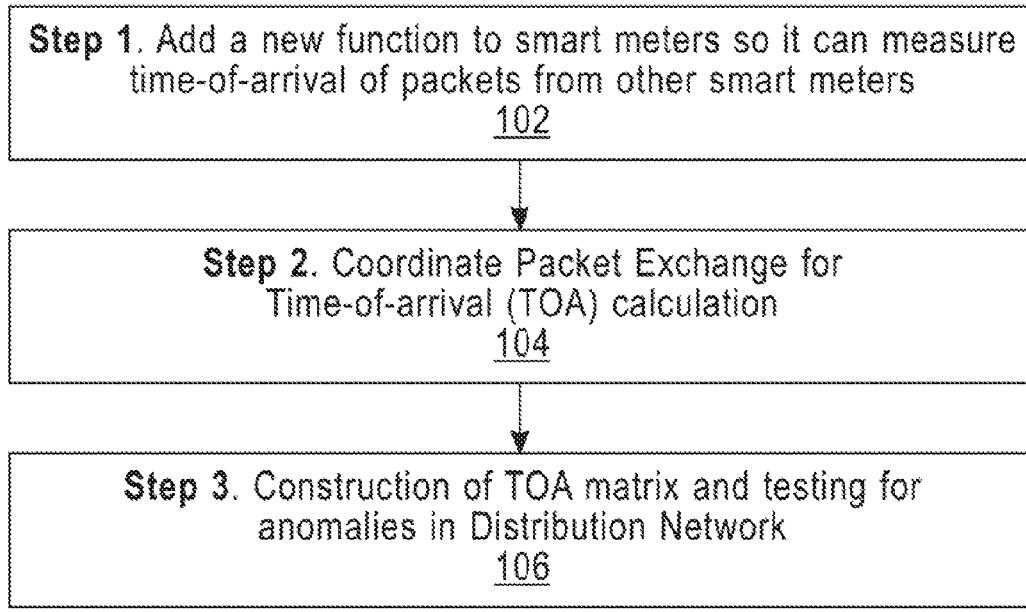
FIG. 1 depicts the implementation steps to upgrade an existing smart meter in accordance with an exemplary embodiment of the present disclosure.

Reference will now be made in more detail to the exemplary embodiments which are illustrated in the accompanying drawings, wherein like reference numerals refer to the like elements throughout.

Exemplary embodiments of the present disclosure use already existing smart meters in the field, such as the ITRON® smart meter (ITRON is a registered trademark of Itron Inc.) which uses the 4G Long-Term Evolution (LTE) GOBI™ embedded mobile broadband modem chipset (GOBI is a trademark of Qualcomm Inc.), which includes GPS capabilities, and uses a GPS pps signal to construct a network topology of smart meters. The smart meters of the present disclosure let smart meters coordinate and exchange information (active message passing and sensing) to reconstruct an electric network of a low voltage electric grids using the time lag to estimate impedance to help reconstruct the electric network.

Referring to FIG. 1, a depiction of the implementation steps to upgrade an existing smart meter is shown. A first Step 1 (102) a new function is added to the smart meters in an electric network being upgraded so that the smart meters can measure time-of-arrival of packets from other smart meters. A second Step 2 (104) involves undertaking a coordinated packet exchange among the smart meters for Time-of Arrival (TOA) calculation. A third Step 3 involves the construction of a TOA matrix based upon the TOA calculation and testing for anomalies in the distribution networks using the TOA matrix.

Figure 2A:
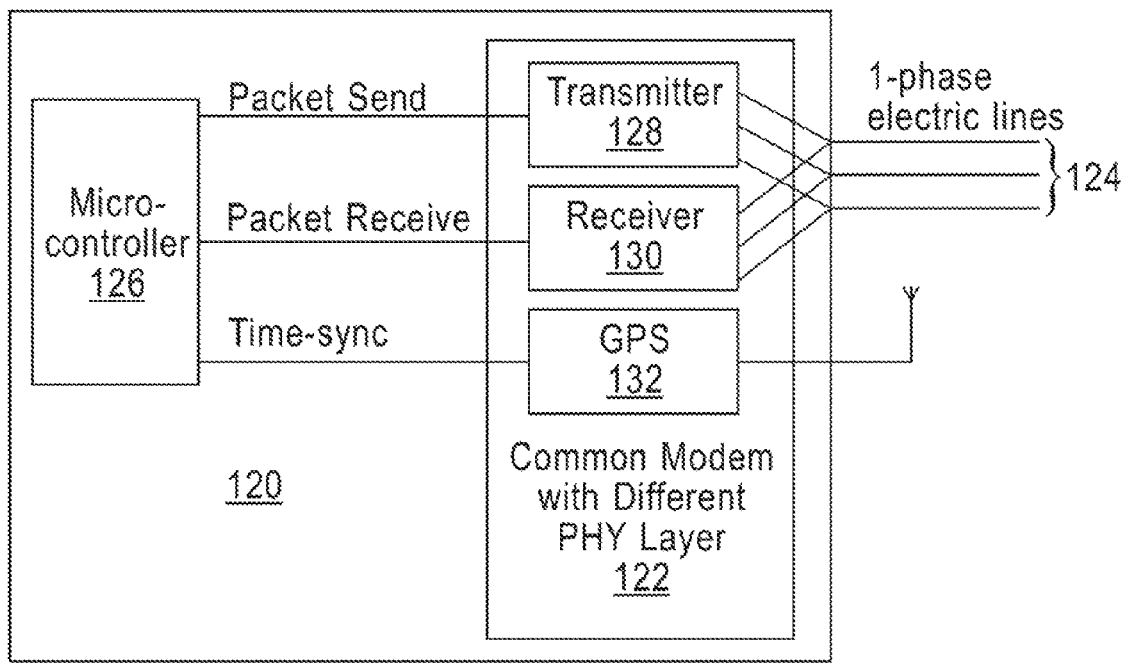
FIGS. 2A and 2B depict smart meters in accordance with exemplary embodiments of the present disclosure.
Figure 2B:
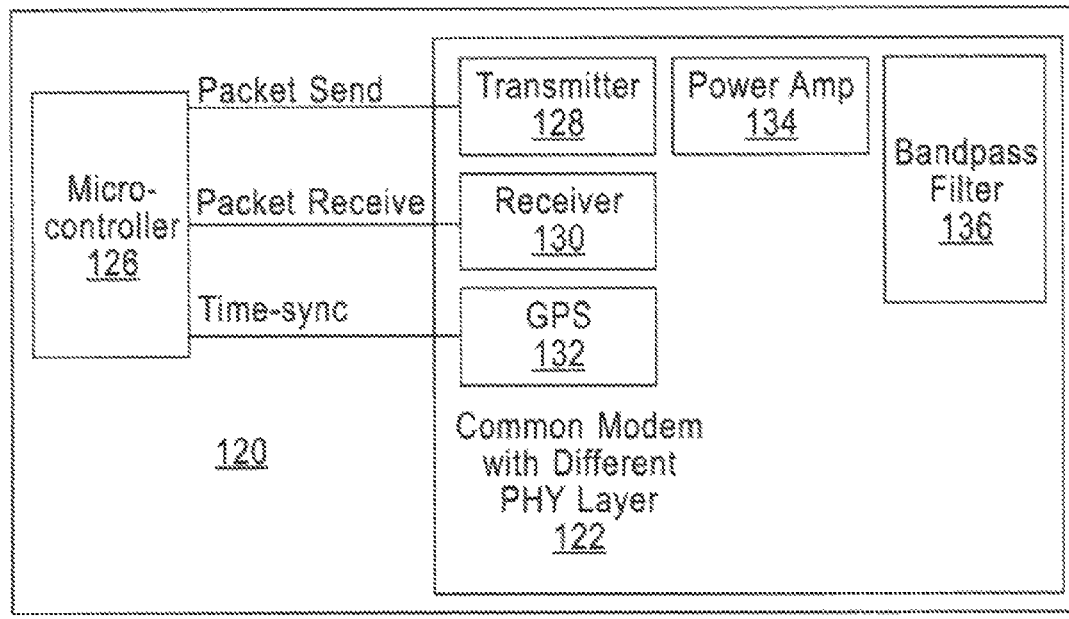

Referring to FIG. 2A, an exemplary embodiment of smart meter 120 includes modified common modem 122 which is connected to single phase electric power lines 124 and controlled by microcontroller 126. In another exemplary embodiment of smart meter 120, as seen in FIG. 2B, an additional power amplifier 134 and bandpass filter 136 are included to provide signal enhancement.

Smart meter 120 is configured to have the ability to: (1) synchronize time using UPS pps signals, which provides an accurate time stamp; (2) can send/receive an identifiable signal through the same phase of electric networks; (3) can identify other smart meters on the same phase lines by listening to the information signal on the same phase lines; and (4) can calculate TOA of an identifiable signal from other smart meters. The TOA information is used to calculate the line length, which is then used to calculate impedance of a line and topology of the electric network. The system then constructs an electric network by combining geo-spatial information and tree-like usual connection information.

In computer networking, a medium access control (MAC) layer is the lower sublayer of the data link layer (layer 2) of the seven-layer open systems interconnection (OSI) model. The MAC sublayer provides addressing and channel access control mechanisms that make it possible for several terminals or network nodes to communicate within a network that incorporates a shared medium. The MAC sublayer acts as an interface between the logical link control (LLC) sublayer and the networks physical (PHY) layer in the seven-layer OSI model of computer networking. The PHY layer consists of the basic networking hardware transmission technologies of a network. It is a fundamental layer underlying the logical data structures of the higher level functions in a network.

Modified common modem 122 is modified to include a PHY layer configured to allow smart meter 120 the ability to execute the functionality and equations described below utilizing transmitter 128 which receives Packet Send commands from microcontroller 126, receiver 130 which receives Packet Receive commands from microcontroller 126, and GPS module 132 which provides Time-Sync data to microcontroller 126. Transmitter 128 and receiver 130 are configured to allow smart meters 120 to exchange signals amongst other smart meters 120 coupled to the same electric power lines 124. GPS module 132 is configured to give a precise time synchronization amongst other smart meters 120 coupled to the same electric power lines 124. Smart meters 120 are configured to calculate the time of arrival of signals by comparing a transmission start time and received time wherein the time synchronization allows for a close to exact TOA calculations.

Figures 3A, 3B:
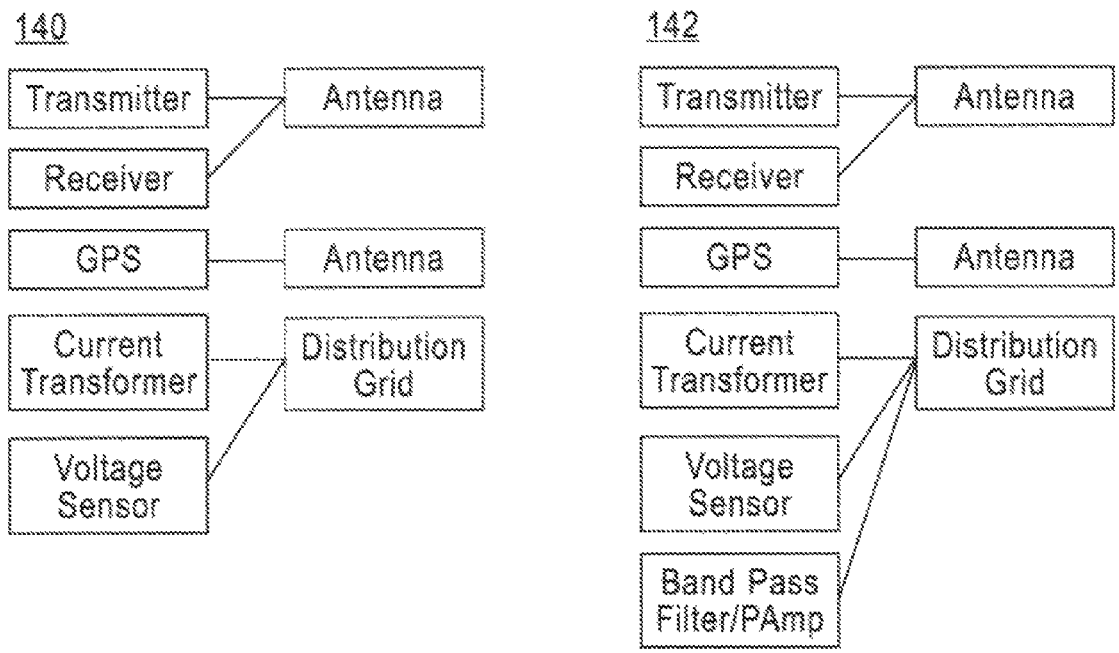
FIGS. 3A and 3B compare a common modem and a modified common modem used in smart meters in accordance with exemplary embodiments of the present disclosure.

From a hardware perspective, referring to FIGS. 3A and 3B, FIG. 3A depicts common modem 140 used in current smart meters, while FIG. 3B depicts the hardware additions of a bandpass filter and power amplifiers to common modem 142 to allow for improved TOA measurements processing. The remaining modifications to provide for the operation of modified common modems 122, 142 is in software modifications executable by processing hardware.

Figure 4A:
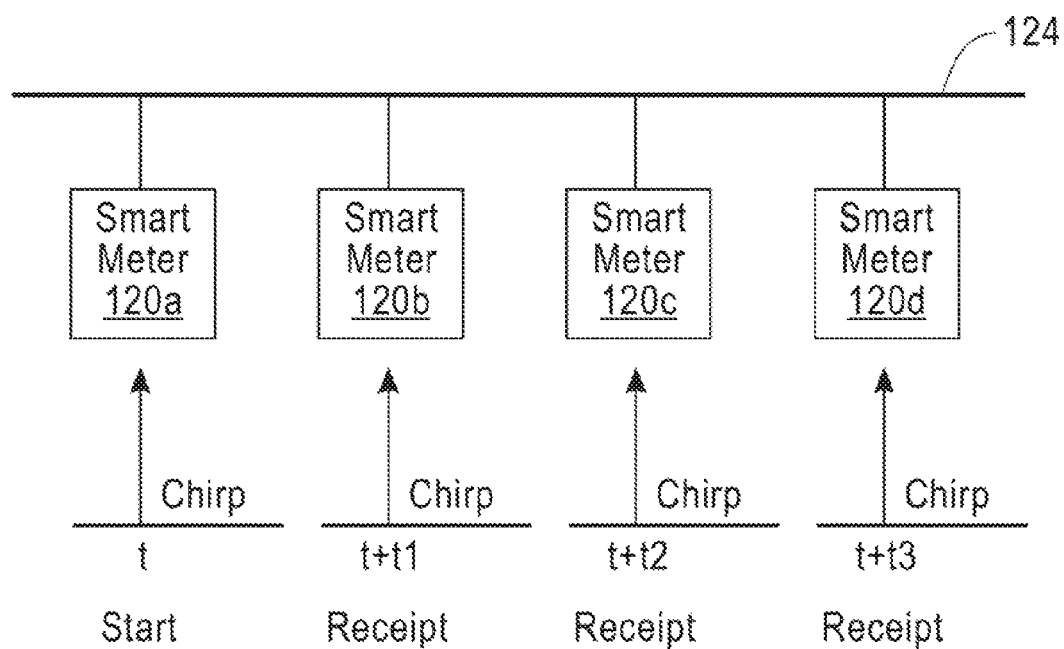
FIGS. 4A and 4B and depict multiple smart meters for line length calculation and electric network creation in accordance with exemplary embodiments of the present disclosure.
Figure 4B:
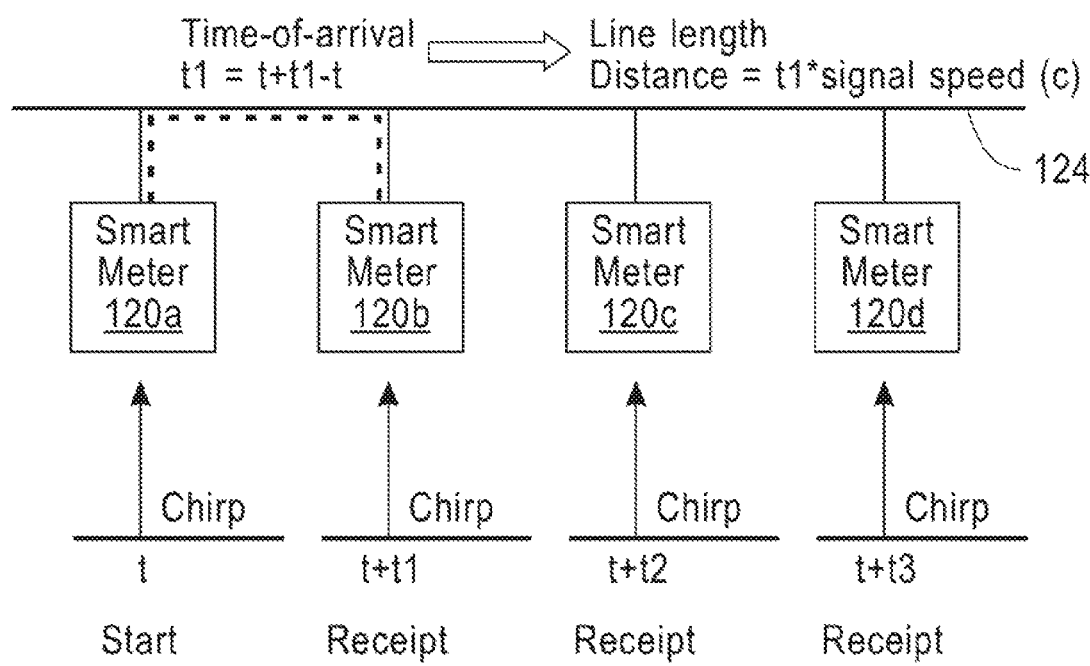

Referring now to FIGS. 4A and 4B, an operation of plurality of smart meters 120a, 120b, 120, 120d connected to, and spaced apart on, electric power lines 124, is depicted, wherein a chirp signal sent at time t by smart meter 120a has a TOA of t+t1 at smart meter 120b, a TOA at smart meter 120c of t+t2 and a TOA of at smart meter 120d of t+t3.

As seen in FIG. 4B, a key factor in establishing the time of arrival of the electric signal is due to the group speed of the signal in the line as in any other communication system.

Referring to FIG. 5, a chirp signal, is a well known signal generation technique that has its distinctive signal characteristics. It is a signal in which the frequency increases ('cup-chirp') or decreases ('down-chirp') with time. A linear chirp waveform provides a sinusoidal wave that increases in frequency linearly over time. A chirp signal can be generated with analog circuitry voltage controlled oscillator (VCO), and a linearly or exponentially ramping control voltage. FIG. 5. shows a chirp packet which is utilized by the smart meters in accordance with exemplary embodiments of the present disclosure. The chip packet includes a chirp signal, a coded smart meter ID and a coded global time stamp.

Referring back to FIG. 4A, steps to create an electric network in accordance with an exemplary embodiment of the present disclosure includes:
1) the farthest end smart meter is chosen.
2) the line length is calculated from the farthest smart meter to the other smart meters.
3) the smart meters are ordered by their distance.
4) the line length between a part of smart meters (e.g., first to second, second to third, third to fourth) is calculated.
5) the impedance for each line segment is calculated.
6) an electric line network as impedance is created.

In accordance with FIGS. 6 and 7A, 7B, which respectively depict the construction of a characteristic matrix and anomaly testing routines, and equations (28) (36) set forth below:
1) A set of smart meters create a time-of-arrival measurement matrix T. Each element t[i,j] shows the measured time-of-arrival.
2.) A symmetry metric can be tested by checking the temporal delay from i to j and j to i (first equation).
3) A temporal path anomaly can be tested using the temporal delay from i to j and its velocity c[i,j] and the physical distance between smart meters d[i,j].
4) An abnormal impedance can be tested if the calculated impedance by calculating the impedance based on the 'length of the line' and the unit impedance.
5) A consecutive temporal delay can be also used to check the consistent temporal delays by checking the average temporal delay in the past, and the current temporal delay. Once the time of arrival matrices are constructed, the equations below can be used to quantify potential anomalies.

$$T = [t_{i,j}] \tag{28}$$

where T is a time of travel measurement matrix, $t_{i,j}$ is a time of travel from i-th smart meter to j-th smart meter, and $t_{i,j}$=0.

$$Z_u = [u_{i,j}] \tag{29}$$

where is a unit impedance matrix, $u_{i,j}$ is a unit impedance of the line between i-th smart meter to j-th smart meter.

$$C_u = [c_{i,j}] \tag{30}$$

where $C_u$ is a group velocity of communication packet, $C_{i,j}$ is a group velocity of communication packet between i-th smart meter and j-th smart meter, $$D = (d_{i,j}) \tag{31}$$

where D is a Euclidean distance matrix between i-th smart meter and j-th smart meter.

$$Z = [z_{i,j}] = [u_{i,j} t_{i,j} c_{i,j}] \tag{32}$$

where Z is an impedance matrix,
Testing for symmetry $$|t_{i,j} - t_{j,i}| \square 0 \quad (33)$$

Temporal path anomaly $$|t_{i,j} c_{i,j} - d_{i,j}| \leq E \quad (34)$$

where E is an acceptable discrepancy.
Testing for abnormal impedance $$z_{i,j} \square 0 \quad (35)$$

where $i \approx j$.
Testing for inconsistent time-of-arrival $$\bar{t}_{i,j} \square t_{i,j}(k) \quad (36)$$

where $\bar{t}_{i,j}$ is a mean time-of arrival and $t_{i,j}(k)$ is a k-th sample of time-of-arrival between i-th and j-th smart meters.
Testing for outlier paths
1. Calculate a normal time-of-arrival/spatial distance $t_{i,j}/d_{i,j}$
2. Characterize the distribution of $t_{i,j}/d_{i,j}$ where $i \neq j$
3. Identify $t_{i,j}/d_{i,j}$ is not similar to a normal population of $\{t_{i,j}/d_{i,j}\}$ The block diagrams in the figures illustrate the architecture, functionality, and operation of possible implementations of systems, methods and computer program products according to various embodiments. In this regard, each block in the block diagrams may represent a module, segment, or portion of code, which comprises one or more executable instructions for implementing the specified logical function(s). It should also be noted that, in some alternative implementations by those skilled in the art, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

Although illustrative embodiments of the present disclosure have been described herein with reference to the accompanying drawings, it is to be understood that the present disclosure is not limited to those precise embodiments, and that various other changes and modifications may be made therein by those skilled in the art without departing from the scope of the claims next presented.

The invention claimed is:

1. A method for obtaining and assessing an electric power network of low voltage distribution grids, the method comprising:
   exchanging information among smart meters of the electric power network by:
      measuring by the smart meters the time-of-travel of signal packets from other smart meters of the electric power network through the power lines using an accurate time synchrony to synchronize time to achieve nano second level synchronization accuracy, and
      measuring signal distortion,
   wherein the signal distortion include total harmonic distortion, frequency distortion, and phase distortion.

2. A method for obtaining and assessing an electric power network of low voltage distribution grids, the method comprising:
   exchanging information among smart meters of the electric power network by:
      measuring by the smart meters the time-of-travel of signal packets from other smart meters of the electric power network through the power lines using an accurate time synchrony to synchronize time to achieve nano second level synchronization accuracy; and
      measuring signal distortion,
   and, detecting abnormal operating conditions by comparing a current measurement matrix with an identified normal operating measurement matrix.

3. The method of 2, wherein localization of the abnormal operating conditions is detected by checking the location in the current measurement matrix by mapping row and column of the current measurement matrix to a connection between two smart meters.

* * * * *